US012434085B2

(12) United States Patent
Zhang et al.

(10) Patent No.: US 12,434,085 B2
(45) Date of Patent: Oct. 7, 2025

(54) FIRE EXTINGUISHING SYSTEM AND METHOD FOR ULTRA-HIGH VOLTAGE (UHV) CONVERTER STATION, AND UHV CONVERTER STATION

(71) Applicants: STATE GRID ANHUI ELECTRIC POWER RESEARCH INSTITUTE, Anhui (CN); State Grid Corporation of China, Beijing (CN)

(72) Inventors: Jiaqing Zhang, Anhui (CN); Yubiao Huang, Anhui (CN); Yong Huang, Anhui (CN); Dengfeng Cheng, Anhui (CN); Liufang Wang, Anhui (CN); Shengli Song, Anhui (CN); Jinzhong Li, Anhui (CN); Yifu Zhou, Anhui (CN); Pengcheng Yang, Anhui (CN); Yu Tian, Anhui (CN); Yanguo Ke, Anhui (CN); Sha Luo, Anhui (CN); Jia Xie, Anhui (CN); Minghao Fan, Anhui (CN); Wei Li, Anhui (CN); Yi Guo, Anhui (CN); Fengju Shang, Anhui (CN); Rui Liu, Anhui (CN)

(73) Assignees: STATE GRID ANHUI ELECTRIC POWER RESEARCH INSTITUTE, Hefei (CN); State Grid Corporation of China, Beijing (CN)

( * ) Notice: Subject to any disclaimer, the term of this patent is extended or adjusted under 35 U.S.C. 154(b) by 766 days.

(21) Appl. No.: 17/567,097

(22) Filed: Dec. 31, 2021

(65) Prior Publication Data

US 2022/0118297 A1 Apr. 21, 2022

Related U.S. Application Data

(63) Continuation-in-part of application No. PCT/CN2021/100778, filed on Jun. 18, 2021.

(30) Foreign Application Priority Data

Jun. 19, 2020 (CN) ......................... 202021150110.3
Jun. 22, 2020 (CN) ......................... 202010573965.5
Oct. 14, 2020 (CN) ......................... 202011094069.7

(51) Int. Cl.
*A62C 3/16* (2006.01)
*A62C 37/40* (2006.01)

(52) U.S. Cl.
CPC ................ *A62C 3/16* (2013.01); *A62C 37/40* (2013.01)

(58) Field of Classification Search
CPC ........... A62C 3/16; A62C 35/58; A62C 35/60; A62C 35/64; A62C 37/40
(Continued)

(56) References Cited

U.S. PATENT DOCUMENTS

2024/0350848 A1* 10/2024 Zhang ...................... A62C 5/02

FOREIGN PATENT DOCUMENTS

CN 210521602 U 5/2020
CN 111228682 A 6/2020

OTHER PUBLICATIONS

Da-Wei Jiang, Discussion on the Water Spray Extinguishing System of Oil Immersed Transformer, Guangzhou Chemical Industry, Apr. 2013, pp. 240-242, vol. 41, No. 8.

(Continued)

*Primary Examiner* — Christopher S Kim

(57) ABSTRACT

Disclosed are a fire extinguishing system and method for an ultra-high voltage (UHV) converter station, and a UHV converter station. The fire extinguishing system includes a spray fire extinguishing system and a fire monitor-based fire extinguishing system, where the spray fire extinguishing system includes a first fire pipe and a spray pipe; the fire
(Continued)

monitor-based fire extinguishing system includes a second fire pipe and a fire monitor; one fire monitor is disposed right above a firewall on both sides of each converter transformer in the UHV converter station, and each fire monitor is connected to one second fire pipe; a spray pipe is disposed on the firewall on both sides of each converter transformer; and the fire monitor corresponding to each converter transformer, and an outlet of the spray pipe connected to the first fire pipe corresponding to each converter transformer face the converter transformer.

11 Claims, 9 Drawing Sheets

(58) Field of Classification Search
USPC .................................. 169/46, 47, 54, 70, 16
See application file for complete search history.

(56) References Cited

OTHER PUBLICATIONS

Benjie Du et al., Fire hazards and preventive measures of oil-immersed transformers, Fire Science and Technology, Mar. 2006, pp. 146-147, vol. 25, Supplement.

Jie Zhao et al., Application of water-mist projector fire-extinguishing system in the large oil-immersed transformers, Shanxi Architecture, May 2009, p. 171-172, vol. 35, No. 14.

Hui-Qiang Zhi et al., Test study on fire extinguishing performance of water spray fire protection systems on oil-immersed transformer fire, Fire Science and Technology, Dec. 2012, pp. 1303-1305, vol. 31, No. 12.

Tao Han, Analysis on the design of fire protection system for oil-immersed transformer, Management & Technology of SME, 2009, pp. 287-288, vol. 7.

* cited by examiner

FIRE EXTINGUISHING SYSTEM AND METHOD FOR ULTRA-HIGH VOLTAGE (UHV) CONVERTER STATION, AND UHV CONVERTER STATION

CROSS REFERENCE TO RELATED APPLICATIONS

The present application is a Continuation-In-Part Application of PCT Application No. PCT/CN2021/100778 filed on Jun. 18, 2021, which claims the benefit of Chinese Patent Application Nos. 202021150110.3 filed on Jun. 19, 2020, 202010573965.5 filed on Jun. 22, 2020 and 202011094069.7 filed on Oct. 14, 2020. All the above are hereby incorporated by reference. the contents of which are incorporated herein by reference in their entirety.

TECHNICAL FIELD

The present disclosure relates to the ultra-high voltage (UHV) field, and more specifically, to a fire extinguishing system and a method for a UHV converter station, and a UHV converter station.

BACKGROUND

Ultra-high voltage direct current (UHVDC) transmission is one of the most advanced transmission technologies in the world. China has become a major power of UHVDC transmission in the world and led the development of the UHVDC transmission technology. On Jan. 11, 2016, the ±1100 kV UHVDC transmission project from Zhundong to southern Anhui (from Changji in Xinjiang to Xuancheng in Anhui) was started. This is a UHV transmission project with the highest voltage class, the largest transmission capacity, the furthest transmission distance and the most advanced technical level in the world.

As an important constituent part of a power grid, a UHV converter station is responsible for a power transmission task of the whole country. Normal and stable operation of the UHV converter station is of great significance to production, life, and stability of the society. A converter transformer in the UHV converter station is a large oil-bearing device, and a single device contains about 200 tons of transformer oil. A fire of the converter transformer is often accompanied by explosion, deflagration, and other phenomena. If a fire of a single transformer cannot be controlled in time and effectively, a plurality of converter transformers in a single-valve bank and precision devices in an adjacent valve hall may be damaged seriously, resulting in incalculable economic losses and social impact.

All the time, fire extinguishing technologies used to extinguish transformer fires in China include a water mist fire extinguishing system, a stationary water spray fire extinguishing system, an SD foam spray fire extinguishing system, an oil evacuation and nitrogen injection fire extinguishing system, and a high-pressure fully-submerged $CO_2$ fire extinguishing system. Researchers have carried out related research on characteristics and applicability of various fire extinguishing technologies, and compared and analyzed advantages and disadvantages of various fire extinguishing means. In other countries, a full-automatic type-A compressed air foam system (CAFS) is used.

Research has also been carried out for a transformer fire extinguishing system in China. Published by East China Engineering Science and Technology Co., Ltd., the journal *Discussion on Water Spray Extinguishing System of Oil Immersed Transformer* [J]. Guangzhou Chemical Industry, 2013, 41 (8): 240-242 studied fire extinguishing systems commonly used to protect various oil-immersed transformers and described an extinguishing principle and a structure of a water spray fire extinguishing system. Published by Leshan Fire Brigade, the journal *Fire Hazards of Oil-Immersed Transformer and Preventive Measures* [J]. Fire Science and Technology, 2006 (b03): 146-147 studied a structure of an oil-immersed power transformer and fire prevention measures, and described the water spray fire extinguishing system and the oil evacuation and nitrogen injection fire extinguishing system in detail. Published by China United Engineering Corporation, the journal *Primary Research on Application Of Water Spray Fire Extinguishing System for Large Oil-Immersed Transformer* [J]. Shanxi Architecture, 2009, 35 (14): 171-172 studied application of the water spray fire extinguishing system in a large oil-immersed transformer, described a structure and a control method of the water spray fire extinguishing system of the large oil-immersed transformer, and discussed problems needing attention in design, to continuously improve the system design. Published by Tianjin Fire Research Institute of the Ministry of Public Security, the journal *Test Study on Fire Extinguishing Performance of Water Spray Protection Systems on Oil-Immersed Transformer Fire* [J]. Fire Science and Technology, 2012, 31 (12): 1303-1305 conducted experimental study on extinguishing a fire of the oil-immersed transformer by using the water spray fire extinguishing system, and put forward suggestions for the water spray fire extinguishing system of the transformer. Published by HeBei Energy Engineering Design Co., Ltd., the journal *Analysis on Design of Oil-Immersed Transformer Fire Extinguishing System* [J]. Management & Technology of SME, 2009 (7): 287-288 compared the water spray fire extinguishing system, the SD foam spray fire extinguishing system, and the high-pressure fully-submerged $CO_2$ fire extinguishing system.

The research on the fire extinguishing technologies for the transformer in China mostly focuses on conventional transformers, and conventional fire extinguishing means such as water mist fire extinguishing and foam spray fire extinguishing are used. The application of new technologies such as a compressed air foam (CAF) technology and other efficient water-base fire extinguishing technologies in China is lagging behind other countries. In addition, there is no research on a fire extinguishing technology and system for a large converter transformer in a new UHV converter station with a complex structure such as box-in, and applicability of various fire extinguishing technologies to a UHV converter transformer is not clear.

To sum up, a current fire extinguishing system deployed in a converter station cannot completely cover special fire behaviors of the converter transformer. There are the following problems in a fire extinguishing system in a converter transformer region of the converter station: (1) At present, all fire extinguishing systems in the converter transformer region of the converter station are water spray fire extinguishing systems or foam spray fire extinguishing systems. Accidents and related study show that the two types of systems cannot completely cover all fire characteristics and behaviors of the UHV converter transformer. (2) Only a single fire extinguishing system is deployed in the converter transformer region, resulting in insufficient system redundancy and low system reliability. (3) At present, a terminal release apparatus of the fire extinguishing system of the converter station is a pressure sprayer, which is deployed around the converter station and does not have any capability against explosive impact. In case of an explosion, a system failure may be caused. (4) Accidents show that a lifting seat and a bushing of the converter transformer have a high fire risk. At present, the fire extinguishing system does not provide any additional protective measures for this region. (5) At present, no system response time and response principle are specified for the fire extinguishing system, which creates conditions for the initial development of a fire.

Therefore, in order to realize efficient and reliable fire extinguishing, it is necessary to design a more reliable fire extinguishing system of the UHV converter station.

SUMMARY

A technical problem to be resolved in the present disclosure is how to enable a fire extinguishing system of a UHV converter station to completely cover all fire characteristics and behaviors of a UHV converter transformer.

The present disclosure resolves the above technical problem by using the following technical solutions. A fire extinguishing system for a UHV converter station includes at least one spray fire extinguishing system and at least one fire monitor-based fire extinguishing system, where each spray fire extinguishing system includes a first fire pipe and a spray pipe; each fire monitor-based fire extinguishing system includes a second fire pipe and a fire monitor; at least one fire monitor is disposed right above a firewall on both sides of each converter transformer in the UHV converter station, and each fire monitor is connected to one second fire pipe; at least one spray pipe is disposed on the firewall on both sides of each converter transformer, and each spray line is connected to one first fire pipeline; and the fire monitor corresponding to each converter transformer, and an outlet of the spray pipe connected to the first fire pipe corresponding to each converter transformer face the converter transformer.

When a converter transformer is on fire, the fire extinguishing system provided in the present disclosure starts the spray fire extinguishing system and the fire monitor-based fire extinguishing system at the same time. The spray fire extinguishing system supports spray fire extinguishing, and is disposed on firewalls on both sides of the converter transformer and located at a lower end and a surrounding region of the converter transformer, to realize full-coverage fire extinguishing. The pipe of the fire monitor-based fire extinguishing system is disposed at a higher end of the converter transformer and supports fire extinguishing by using the fire monitor, to realize fire suppression and extinguishing for key parts of the converter transformer. The two fire extinguishing systems each act on the converter transformer on fire and completely cover all fire characteristics and behaviors of the UHV converter transformer, thereby overcoming existing design shortcomings and defects of the fire extinguishing system, and realizing efficient and reliable fire extinguishing.

The fire extinguishing system further includes a first fire extinguishing medium generation subsystem, a second fire extinguishing medium generation subsystem, and a control module, where the control module is separately connected to the first fire extinguishing medium generation subsystem and the second fire extinguishing medium generation subsystem, an outlet of the first fire extinguishing medium generation subsystem is connected to inlets of all the first fire pipes and inlets of all the second fire pipes, and an outlet of the second fire extinguishing medium generation subsystem is connected to the inlets of all the first fire pipes and the inlets of all the second fire pipes.

Further, the UHV converter station includes a plurality of single-valve bank converter transformers disposed in parallel to each other, where each single-valve bank converter transformer includes a plurality of converter transformers disposed at equal intervals, adjacent converter transformers are separated by the firewall, one valve hall is disposed in parallel on a rear side of each single-valve bank converter transformer, a single-valve bank converter transformer and a corresponding valve hall constitute a pole as a whole, two poles constitute a pole group, each pole group includes a higher-end valve bank and a lower-end valve bank, two poles in a same pole group are mirror-symmetrically disposed, lower-end valve banks or higher-end valve banks of adjacent pole groups are disposed back-to-back, and a bushing, on a valve hall side, of each converter transformer extends into a valve hall corresponding to the bushing.

Further, an end, close to the first fire extinguishing medium generation subsystem and the second fire extinguishing medium generation subsystem, of each single-valve bank converter transformer is provided with a first zone selector valve and a second zone selector valve, and each first fire pipe is connected to the first zone selector valve of the corresponding single-valve bank converter transformer; the fire monitor is disposed on an overhanging eave of each valve hall and faces the firewall, and each fire monitor is connected to one second zone selector valve by using the second fire pipe; each first zone selector valve and each second zone selector valve are connected to the outlet of the first fire extinguishing medium generation subsystem by using a first foam supply pipe; and each first zone selector valve and each second zone selector valve are connected to the outlet of the second fire extinguishing medium generation subsystem by using a second foam supply pipe.

Further, the spray pipe is an anti-explosion spray pipe.

Further, a middle part of each converter transformer is provided with a bushing and a bushing lifting seat, the spray pipe is a cross-shaped pipe composed of a horizontal pipe and a vertical pipe, the vertical pipe, the bushing lifting seat, and the bushing are separately perpendicular to the ground, the horizontal pipe is connected to the first fire pipe on a lateral side of the firewall, and the horizontal pipe and the vertical pipe each are provided with a plurality of outlets.

Further, a noise reduction plate is disposed around the converter transformer, the noise reduction plate and the converter transformer are located between two firewalls as a whole, the bushing and the bushing lifting seat pass through the noise reduction plate, and are located right above the middle part of the converter transformer, the first fire pipe on the firewall passes through the noise reduction plate to be connected to the horizontal pipe, the plurality of outlets of the horizontal pipe face the converter transformer, and the vertical pipe passes through the noise reduction plate and is parallel to the bushing and the bushing lifting seat.

Further, the first fire extinguishing medium generation subsystem and the second fire extinguishing medium generation subsystem are disposed away from a region in which the converter transformer is located.

Further, both the first fire extinguishing medium generation subsystem and the second fire extinguishing medium generation subsystem are CAF generation subsystems, and fire extinguishing media output by the first fire extinguishing medium generation subsystem and the second fire extinguishing medium generation subsystem are CAF.

The present disclosure further provides a fire extinguishing method for a UHV converter station, where the method includes:

when a converter transformer is on fire, enabling the spray fire extinguishing system and the fire monitor-based fire extinguishing system at the same time, where the outlet of the first fire pipe of the spray fire extinguishing system is connected to the spray pipe, a plurality of outlets of the spray pipe face a surrounding region of the converter transformer to realize spray fire extinguishing, and the spray pipe is located both at a lower end and on a lateral side of the converter transformer to realize full-coverage fire extinguishing; the outlet of the second fire pipe of the fire monitor-based fire extinguishing system is connected to the fire monitor, and the second fire pipe is disposed at a higher end of the converter transformer and supports fire extinguishing by using the fire monitor, to realize fire suppression and extinguishing for key parts of the converter transformer; and the two fire extinguishing systems each act on the converter transformer on fire and completely cover all fire characteristics and behaviors of the UHV converter transformer.

Further, according to the method, the fire extinguishing system further includes the first fire extinguishing medium generation subsystem, the second fire extinguishing medium generation subsystem, and the control module; and when a converter transformer is on fire, in the first fire extinguishing medium generation subsystem and the second fire extinguishing medium generation subsystem, the control module controls one fire extinguishing medium generation subsystem close to the converter transformer to preferentially provide a fire extinguishing medium for the first fire pipe to perform whole-region fire extinguishing on a main body and a surrounding region of the converter transformer on fire by using the spray pipe on firewalls on both sides of the converter transformer, and controls the other fire extinguishing medium generation subsystem far away from the converter transformer to provide a fire extinguishing medium for the second fire pipe, where the outlet of the second fire pipe is located at a high end above the converter transformer, and the fire extinguishing medium is emitted from the outlet of the second fire pipe for fire suppression and extinguishing.

Further, the fire extinguishing system further includes higher-end and lower-end valve banks of a first pole, a first local control cabinet, higher-end and lower-end valve banks of a second pole, a second local control cabinet, the first zone selector valve, and the second zone selector valve, the first fire pipe is connected to the first zone selector valve, the second fire pipe is connected to the second zone selector valve, the first zone selector valve and the second zone selector valve each are connected to the first fire extinguishing medium generation subsystem and the second fire extinguishing medium generation subsystem by using pipes, the higher-end and lower-end valve banks of the first pole are disposed in a square of the first pole, and the higher-end and lower-end valve banks of the second pole are disposed in a square of the second pole; and when the higher-end and lower-end valve banks of the first pole are on fire, the control module opens, by using the first local control cabinet, the first zone selector valve connected to the first fire extinguishing medium generation subsystem closest to the valve banks on fire, and automatically starts the first fire extinguishing medium generation subsystem, and the first fire pipe connected to the first zone selector valve emits foam by using the spray pipe, to realize spray fire extinguishing for the higher-end and lower-end valve banks of the first pole.

Further, when the higher-end and lower-end valve banks of the first pole are on fire, the control module opens, by using the second local control cabinet, the second zone selector valve connected to the second fire extinguishing medium generation subsystem, and automatically starts the second fire extinguishing medium generation subsystem, and the second fire pipe connected to the second zone selector valve emits foam by using the fire monitor, to realize fire extinguishing for the higher-end and lower-end valve banks of the first pole by using the fire monitor.

Further, when the high-end and low-end valve banks of the first pole are on fire, the control module opens, by using the second local control cabinet, the second zone selector valve connected to the second fire extinguishing medium generation subsystem, and automatically starts the second fire extinguishing medium generation subsystem, and the second fire pipe connected to the second zone selector valve emits foam by using the fire monitor, to realize fire extinguishing for the high-end and low-end valve banks of the first pole by using the fire monitor.

Further, when the higher-end and lower-end valve banks of the first pole are not on fire, but the higher-end and lower-end valve banks of the second pole are on fire, the control module opens, by using the first local control cabinet, the first zone selector valve connected to the second fire extinguishing medium generation subsystem closest to the higher-end and lower-end valve banks of the second pole, and automatically starts the second fire extinguishing medium generation subsystem, and the first fire pipe connected to the first zone selector valve emits foam by using the spray pipe, to realize spray fire extinguishing for the higher-end and lower-end valve banks of the second pole.

Further, when the higher-end and lower-end valve banks of the second pole are on fire, the control module opens, by using the second local control cabinet, the second zone selector valve connected to the second fire extinguishing medium generation subsystem, and automatically starts the second fire extinguishing medium generation subsystem, and the second fire pipe connected to the second zone selector valve emits foam by using the fire monitor, to realize fire extinguishing for the higher-end and lower-end valve banks of the second pole by using the fire monitor.

The method further includes:

when one of the first fire extinguishing medium generation subsystem and the second fire extinguishing medium generation subsystem is faulty, controlling, by the control module, a fire extinguishing medium, output by the normal fire extinguishing medium generation subsystem, to be transmitted to the first fire pipe to preferentially perform fire extinguishing on the converter transformer on fire by using the spray pipe, to realize whole-region fast fire extinguishing.

Further, when the higher-end and lower-end valve banks of the first pole are on fire, and the first fire extinguishing medium generation subsystem is faulty, the control module opens, by using the second local control cabinet, the first zone selector valve connected to the second fire extinguishing medium generation subsystem, and automatically starts the second fire extinguishing medium generation subsystem, the second fire extinguishing medium generation subsystem transmits a fire extinguishing medium to the first fire pipe, and the first fire pipe connected to the first zone selector valve emits foam by using the spray pipe, to realize spray fire extinguishing for the higher-end and lower-end valve banks of the first pole.

Further, when the higher-end and lower-end valve banks of the first pole are on fire, and the second fire extinguishing medium generation subsystem is faulty, the control module opens, by using the first local control cabinet, the first zone selector valve connected to the first fire extinguishing medium generation subsystem, and automatically starts the first fire extinguishing medium generation subsystem, the first fire extinguishing medium generation subsystem transmits a fire extinguishing medium to the first fire pipe, and the first fire pipe connected to the first zone selector valve emits foam by using the spray pipe, to realize spray fire extinguishing for the higher-end and lower-end valve banks of the first pole.

The method further includes:

after a preset time interval, controlling, by the control module, the fire extinguishing medium, output by the normal fire extinguishing medium generation subsystem, to be further transmitted to the second fire pipe, where the outlet of the second fire pipe is located at the higher end above the converter transformer, and the fire extinguishing medium is emitted from the outlet of the second fire pipe for fire suppression and extinguishing.

Further, a value range of the preset time interval is 0 min to 5 min.

Further, when the preset time interval is 0, the control module controls the fire extinguishing medium, output by the normal fire extinguishing medium generation subsystem, to be transmitted to the first fire pipe and the second fire pipe at the same time, to simultaneously perform spray fire extinguishing, and fire extinguishing by using the fire monitor.

The present disclosure further provides a UHV converter station with the above fire extinguishing system. The UHV converter station includes a plurality of single-valve bank converter transformers disposed in parallel to each other, at least one CAF generation subsystem, and a control module, where each single-valve bank converter transformer includes a plurality of converter transformers disposed at equal intervals, adjacent converter transformers are separated by the firewall, one valve hall is disposed in parallel on a rear side of each single-valve bank converter transformer, the control module is connected to all CAF generation subsystems, and an outlet of the CAF generation subsystem is connected to inlets of all the first fire pipes and inlets of all the second fire pipes.

The present disclosure has the following advantages:

(1) When a converter transformer is on fire, the fire extinguishing system enables the spray fire extinguishing system and the fire monitor-based fire extinguishing system at the same time. The spray fire extinguishing system supports spray fire extinguishing, and is disposed on the firewalls on both sides of the converter transformer and located at the lower end and the surrounding region of the converter transformer, to realize full-coverage fire extinguishing. The pipe of the fire monitor-based fire extinguishing system is disposed at the higher end of the converter transformer and supports fire extinguishing by using the fire monitor, to realize fire suppression and extinguishing for the key parts of the converter transformer. The two fire extinguishing systems each act on the converter transformer on fire and completely cover all the fire characteristics and behaviors of the UHV converter transformer, thereby overcoming the existing design shortcomings and defects of the fire extinguishing system, and realizing efficient and reliable fire extinguishing.

(2) The pipes of the two fire extinguishing systems in the present disclosure each are connected to the first fire extinguishing medium generation subsystem and the second fire extinguishing medium generation subsystem. The two fire extinguishing medium generation subsystems are mutually standby. When one fire extinguishing medium generation subsystem is faulty, the other fire extinguishing medium generation subsystem can still be used to provide foam for the spray fire extinguishing system and the fire monitor-based fire extinguishing system to perform fire extinguishing, thereby achieving high reliability. In addition, the two fire extinguishing systems are also mutually standby. One fire extinguishing system can also cover the fire extinguishing region. If one fire extinguishing system is faulty, the other fire extinguishing system can still be used to perform fire extinguishing, thereby achieving high reliability.

(3) Because fire and an explosion may easily occur at the lower end of the converter transformer, the spray pipe is the anti-explosion spray pipe, and the foam used by the spray pipe is generated by the remote fire extinguishing medium generation subsystem. Therefore, no pressure sprayer is needed to generate foam, and the foam is directly sprayed through the outlet of the spray pipe to achieve a spraying effect.

(4) A fire and an explosion may most easily occur on the bushing, the bushing lifting seat, and other weak parts of the converter transformer first. Therefore, the vertical pipe of the spray pipe is disposed next to the bushing and the bushing lifting seat. The vertical pipe of the spray pipe, the lifting seat, and the bushing are perpendicular to the ground. The spray pipe can spray the fire extinguishing medium, and protection against fires of the weak parts is strengthened by using the vertical pipe of the spray pipe, thereby improving fire extinguishing efficiency.

(5) The two fire extinguishing medium generation subsystems are respectively disposed near two UHV converter station squares, which are far apart. When a converter transformer is on fire, response time of the two subsystems is different. To achieve an optimal fire extinguishing effect, when a converter transformer is on fire, one fire extinguishing medium generation subsystem close to the converter transformer preferentially provides the fire extinguishing medium for the first fire pipe, and the other fire extinguishing medium generation subsystem far away from the converter transformer provides the fire extinguishing medium for the second fire pipe. When one of the first fire extinguishing medium generation subsystem and the second fire extinguishing medium generation subsystem is faulty, the control module controls the fire extinguishing medium, output by the normal fire extinguishing medium generation subsystem, to be transmitted to the first fire pipe to realize spray fire extinguishing by using the spray pipe. Fire extinguishing is preferentially performed on the surrounding region of the converter transformer by using the spray pipe, thereby achieving high reliability. System response time, principles, and requirements need to be determined to avoid creating conditions for the initial development of the fire.

(6) The first fire extinguishing medium generation subsystem and the second fire extinguishing medium generation subsystem are disposed far away from the region in which the converter transformer is located. The fire extinguishing medium generation subsystems are far away from a possible fire site. In case of a fire, the fire extinguishing medium generation subsystems will not be damaged due to the fire. Even if a fire pipe terminal is damaged due to an explosion, the fire extinguishing medium generation subsystems can still generate the fire extinguishing media and transmit the fire extinguishing media to the fire site through the pipes for fire extinguishing.

(7) A layout strategy, in which the spray fire extinguishing system is disposed at the near end and lower end, and the fire monitor-based fire extinguishing system is disposed at the far end and higher end, is adopted to realize comprehensive three-dimensional fire extinguishing. In addition, the fire monitor is located at the higher end and is not easy to explode. Although the spray pipe is located at the lower end, it has anti-explosion performance. This greatly reduces a risk of a fatal damage to all fire extinguishing systems in the converter transformer region due to high-energy explosive impact of the fire.

Figure 1:
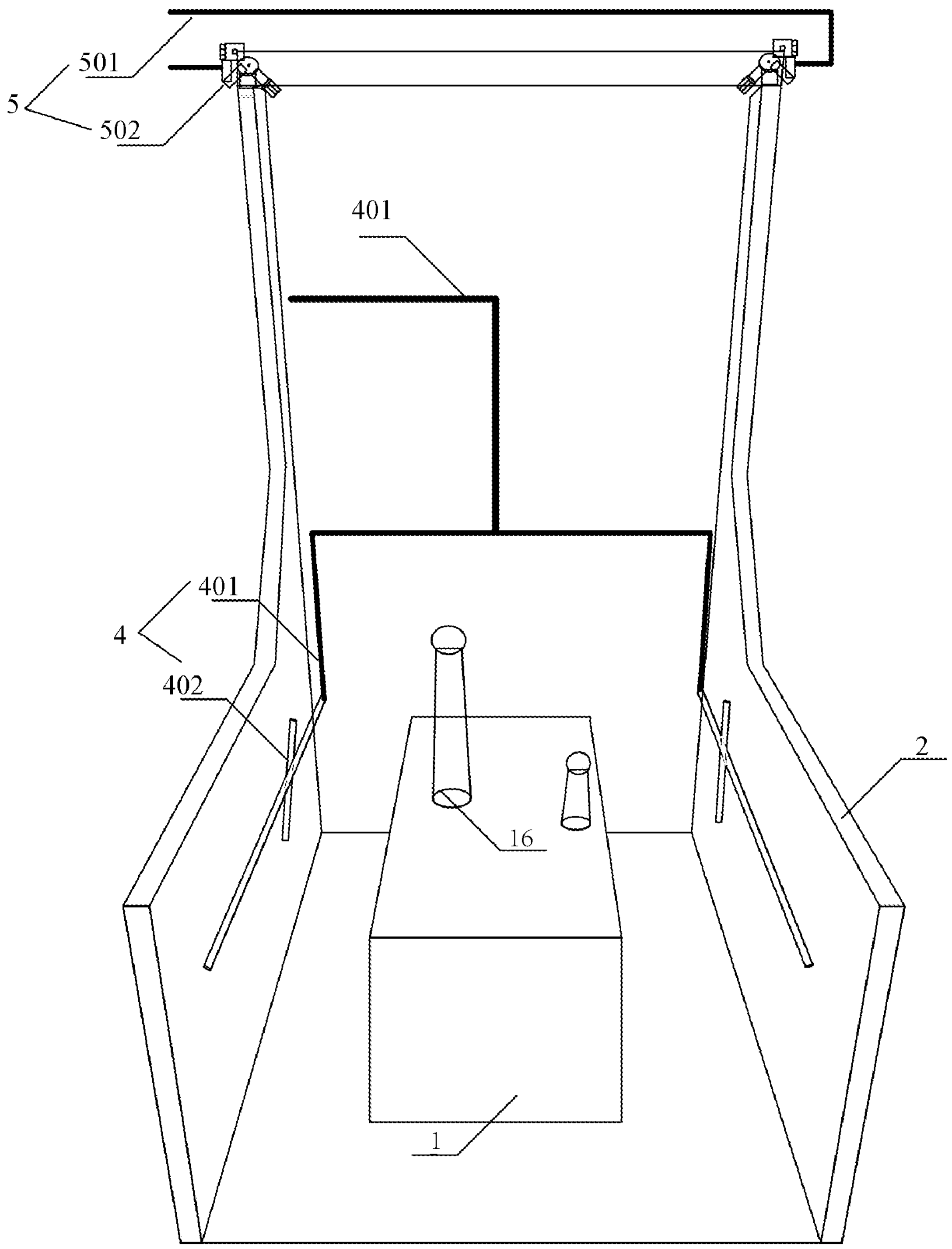
FIG. 1 is a schematic layout diagram of a single converter transformer and its fire extinguishing facilities in a fire extinguishing system for a UHV converter station according to an embodiment of the present disclosure.

In the accompanying drawings, a list of components represented by reference numerals is as follows:

1: converter transformer; 2: firewall; 3: valve hall; 4: spray fire extinguishing system; 101: lateral side of the converter transformer

401: first fire pipe; 402: spray pipe; 5: fire monitor-based fire extinguishing system

501: second fire pipe; 502: fire monitor; 6: first fire extinguishing medium generation subsystem

7: second fire extinguishing medium generation subsystem; 8: control module; 9: first local control cabinet

10: second local control cabinet; 11: first zone selector valve; 12: second zone selector valve

13: selector valve of a main foam supply pipe; 14: first foam supply pipe; 15: second foam supply pipe

16: bushing

DETAILED DESCRIPTION

In order to make the objectives, technical solutions, and advantages of embodiments of the present disclosure clearer, the following text clearly and completely describes the technical solutions in the embodiments of the present disclosure with reference to the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Figure 2:
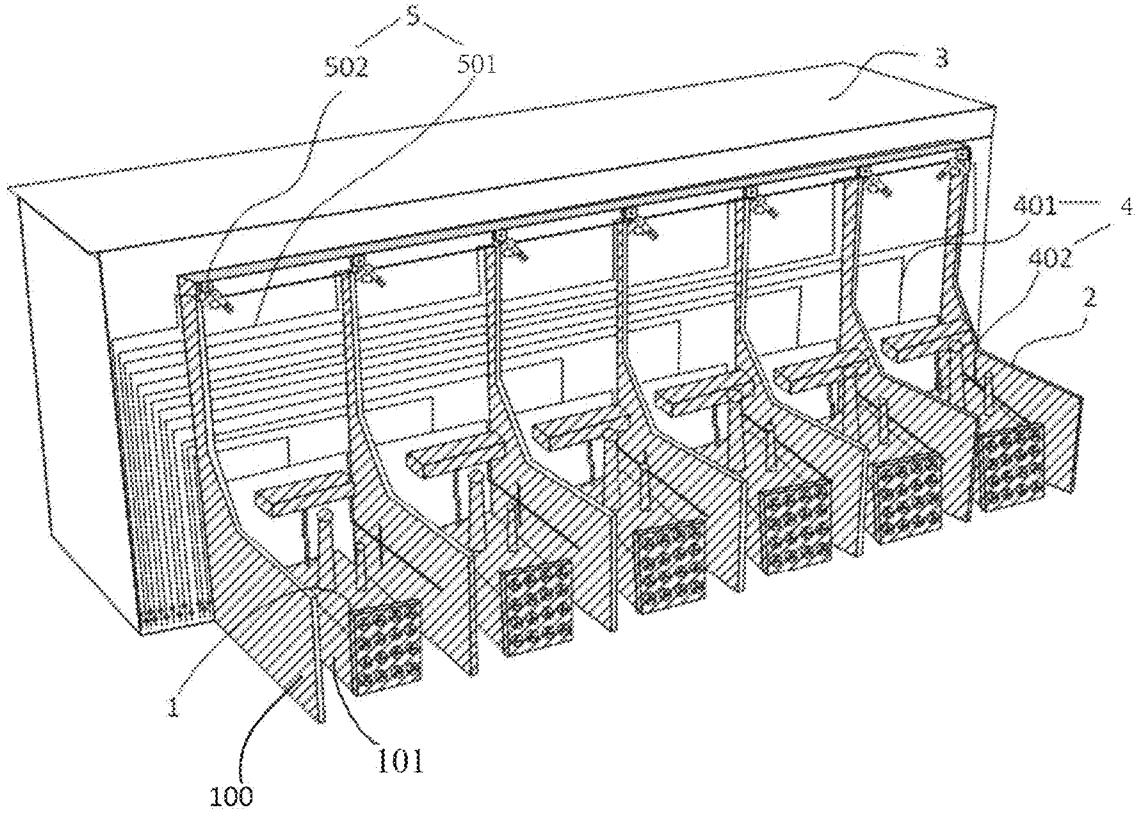
FIG. 2 is a schematic layout diagram of a pole composed of a single-valve bank converter transformer and a valve hall and fire extinguishing facilities of the pole in a fire extinguishing system for a UHV converter station according to an embodiment of the present disclosure.
Figure 3:
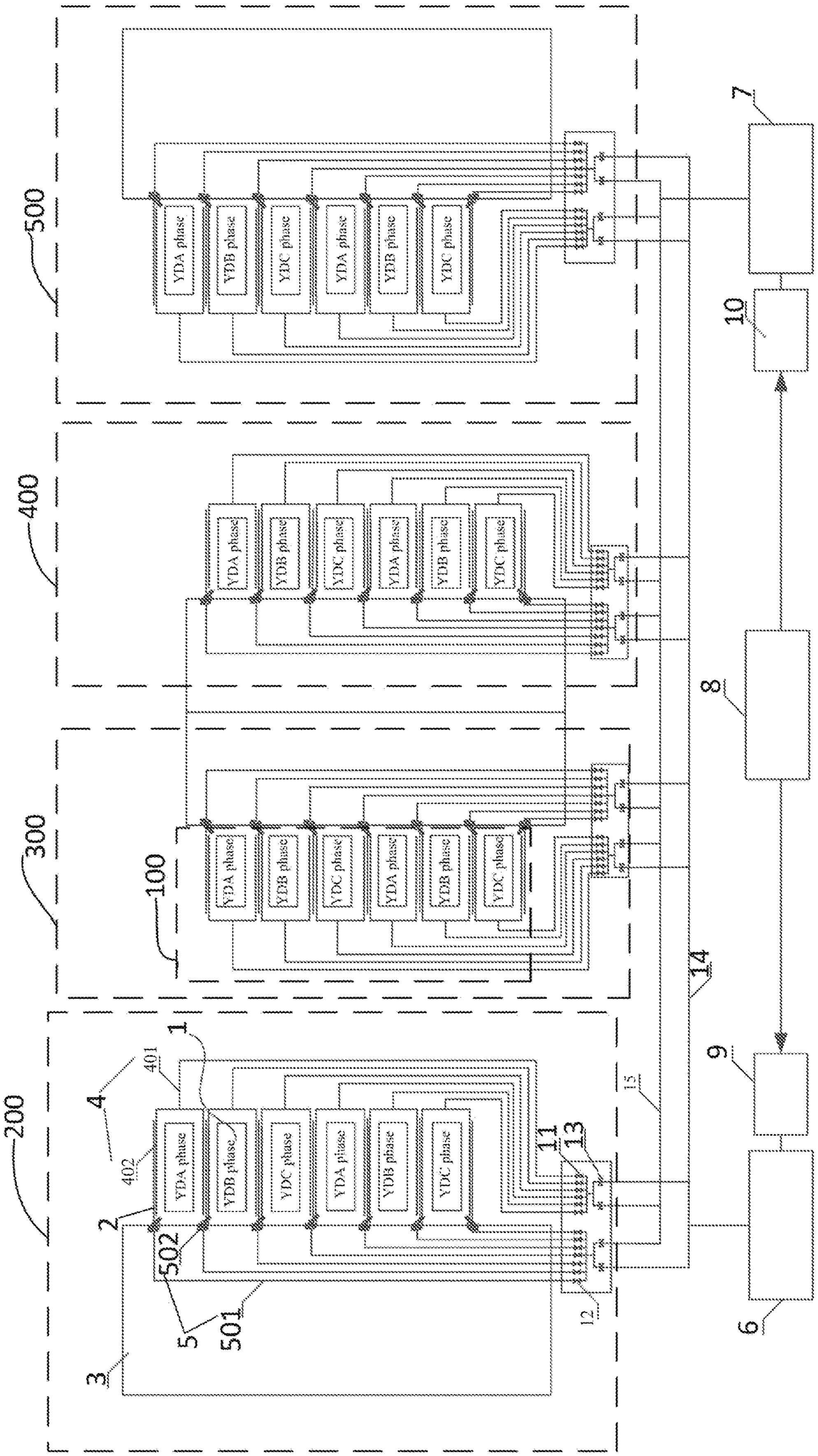
FIG. 3 is a schematic layout diagram of a UHV converter station and its fire extinguishing facilities in a fire extinguishing system for a UHV converter station according to an embodiment of the present disclosure.

An embodiment provides a fire extinguishing system for a UHV converter station. FIG. 1 is a schematic layout diagram of a single converter transformer 1 and its fire extinguishing facilities. FIG. 2 is a schematic layout diagram of a pole composed of a single-valve bank converter transformer 100 and a valve hall 3 and fire extinguishing facilities of the pole. FIG. 3 is a schematic layout diagram of a UHV converter station and its fire extinguishing facilities. The UHV converter station includes a plurality of single-valve bank converter transformers 100 disposed in parallel to each other, where each single-valve bank converter transformer 100 includes a plurality of converter transformers 1 disposed at equal intervals, adjacent converter transformers 1 are separated by a firewall 2, one valve hall 3 is disposed in parallel on a rear side of each single-valve bank converter transformer 100, a single-valve bank converter transformer 100 and a corresponding valve hall 3 constitute a pole as a whole, two poles constitute a pole group, each pole group includes a higher-end valve bank and a lower-end valve bank, two poles in a same pole group are mirror-symmetrically disposed, lower-end valve banks or higher-end valve banks of adjacent pole groups are disposed back-to-back, and a bushing, on a valve hall side, of each converter transformer 1 extends into a valve hall 3 corresponding to the bushing. As shown in FIG. 3, in this embodiment, the UHV converter station includes four valve banks disposed sequentially in parallel, namely, a higher-end valve bank 200 of a first pole, a lower-end valve bank 300 of the first pole, a lower-end valve bank 400 of a second pole, and a higher-end valve bank 500 of the second pole. The higher-end valve bank 200 and the lower-end valve bank 300 of the first pole are mirror-symmetrically disposed, and the higher-end valve bank and the lower-end valve bank 400 of the second pole are mirror-symmetrically disposed. The lower-end valve bank 300 of the first pole and the lower-end valve bank 400 of the second pole are disposed back-to-back. Each single-valve bank converter transformer 100 has six converter transformers 1, and adjacent converter transformers 1 are separated by the firewall 2 and disposed at equal intervals.

Figure 4:
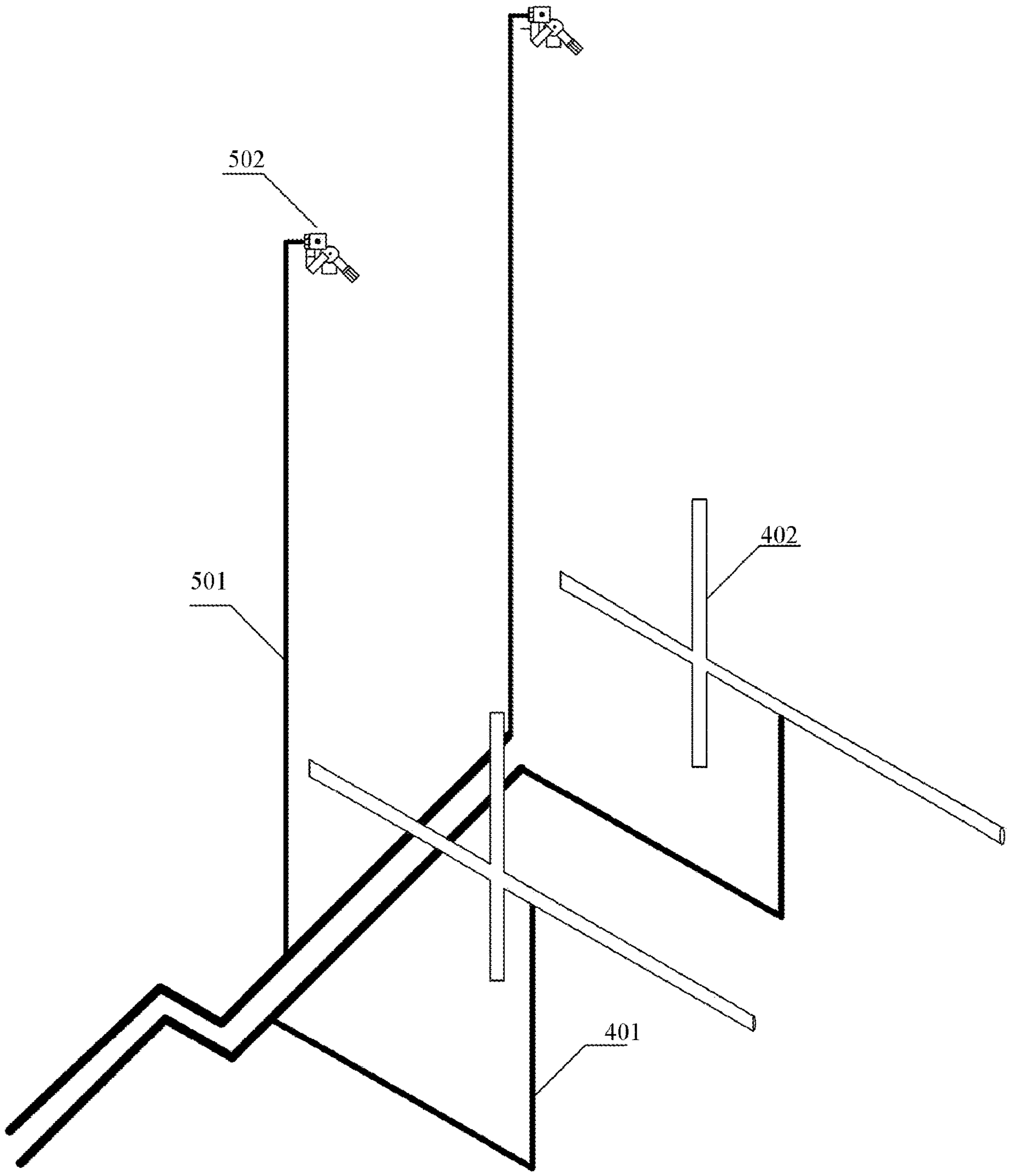
FIG. 4 is a schematic diagram of point and plane-combined fire extinguishing for a single converter transformer in a fire extinguishing system for a UHV converter station according to an embodiment of the present disclosure.

As shown in FIG. 1, FIG. 3, and FIG. 4, the fire extinguishing system for a UHV converter station includes a spray fire extinguishing system 4, a fire monitor-based fire extinguishing system 5, a first fire extinguishing medium generation subsystem 6, a second fire extinguishing medium generation subsystem 7, and a control module 8. The spray fire extinguishing system 4 includes a first fire pipe 401 and a spray pipe 402. The fire monitor-based fire extinguishing system 5 includes a second fire pipe 501 and a fire monitor 502. Both the first fire extinguishing medium generation subsystem 6 and the second fire extinguishing medium generation subsystem 7 are CAF generation subsystems, and fire extinguishing media output by the first fire extinguishing medium generation subsystem 6 and the second fire extinguishing medium generation subsystem 7 are CAF. The first fire extinguishing medium generation subsystem 6 and the second fire extinguishing medium generation subsystem 7 are disposed away from a region in which the converter transformer 1 is located, and are usually disposed in two UHV converter station squares respectively. Specifically, the first fire extinguishing medium generation subsystem 6 is disposed in a square of the first pole, and the second fire extinguishing medium generation subsystem 7 is disposed in a square of the second pole. The fire extinguishing medium generation subsystems are far away from a possible fire site. In case of a fire, the fire extinguishing medium generation subsystems will not be damaged due to the fire. Even if some fire pipe terminals surrounding an explosion point are damaged due to an explosion, the fire extinguishing medium generation subsystems can still generate the fire extinguishing media and transmit the fire extinguishing media to the fire site through other undamaged fire pipes for fire extinguishing.

In the UHV converter station, the second fire pipe 501 is disposed above each converter transformer 1, and the first fire pipe 401 is disposed around each converter transformer 1. One fire monitor 502 is disposed right above each firewall 2 on both sides of each converter transformer 1 in the UHV converter station, and each fire monitor 502 is connected to one second fire pipe 501. The spray pipe 402 is disposed on each firewall 2 on both sides of each converter transformer 1, and each spray pipe 402 is connected to one first fire pipe 401. The fire monitor 502 and an outlet of the spray pipe 402 corresponding to each converter transformer 1 face the converter transformer 1. The control module 8 is connected to the first fire extinguishing medium generation subsystem 6 by using a first local control cabinet 9, and the control module 8 is connected to the second fire extinguishing medium generation subsystem 7 by using a second local control cabinet 10. An outlet of the first fire extinguishing medium generation subsystem 6 is connected to inlets of all the first fire pipes 401 and inlets of all the second fire pipes 501, and an outlet of the second fire extinguishing medium generation subsystem 7 is connected to the inlets of all the first fire pipes 401 and the inlets of all the second fire pipes 501. The first fire extinguishing medium generation subsystem 6 is capable of providing foam for the first fire pipe 401 and second fire pipe 501 simultaneously or separately, and the second fire extinguishing medium generation subsystem 7 is also capable of providing foam for the first fire pipe 401 and second fire pipe 501 simultaneously or separately. However, in practical application, due to a flow of CAF, generally, the first fire extinguishing medium generation subsystem 6 provides foam for the adjacent first fire pipe 401, and the second fire extinguishing medium generation subsystem 7 provides foam for the second fire pipe 501; or the second fire extinguishing medium generation subsystem 7 provides foam for the adjacent first fire pipe 401, and the first fire extinguishing medium generation subsystem 6 provides foam for the second fire pipe 501.

An end, close to the first fire extinguishing medium generation subsystem 6 and the second fire extinguishing medium generation subsystem 6, of each single-valve bank converter transformer 100 is provided with a first zone selector valve 11 and a second zone selector valve 12, and each first fire pipe 401 is connected to the first zone selector valve 11 of the corresponding single-valve bank converter transformer 100. The fire monitor 502 is disposed on an overhanging eave of each valve hall 3 and faces the firewall 2, and each fire monitor 502 is connected to one second zone selector valve 12 by using the second fire pipe 501. Each first zone selector valve 11 and each second zone selector valve 12 are successively connected to the outlet of the first fire extinguishing medium generation subsystem 6 by using a selector valve 13 of a main foam supply pipe and a first foam supply pipe 14. Each first zone selector valve 11 and each second zone selector valve 12 are successively connected to the outlet of the second fire extinguishing medium generation subsystem 7 by using the selector valve 13 of the main foam supply pipe and a second foam supply pipe 15. An outlet of the first fire pipe 401 is connected to the spray pipe 402 to realize spray fire extinguishing, and an outlet of the second fire pipe 501 is connected to the fire monitor 502 to realize fire extinguishing by using the fire monitor 502. The fire pipe of the spray fire extinguishing system 4 is disposed around each converter transformer 1 to perform fire extinguishing around each converter transformer 1. The fire pipe of the fire monitor-based fire extinguishing system 5 is disposed above each converter transformer 1 to emit a fire extinguishing medium from above each converter transformer 1 for fire suppression and extinguishing. The two fire extinguishing systems realize whole-region complete coverage of the converter transformer 1, and completely cover all fire characteristics and behaviors around and above the UHV converter transformer 1. In addition, the two fire extinguishing medium generation subsystems are mutually standby. When one fire extinguishing medium generation subsystem is damaged, the other fire extinguishing medium generation subsystem can continue to provide the fire extinguishing medium, thereby achieving high system reliability.

This embodiment adopts a layout strategy in which the CAF spray fire extinguishing system 4 is disposed at the near end and lower end, namely, a horizontal pipe of the spray pipe 402 is connected to the first fire pipe 401 on a lateral side of the firewall 2 and provided with a plurality of outlets, and the CAF fire monitor-based fire extinguishing system 5 is disposed at the far end and higher end, namely, the fire monitor 502 is disposed on the overhanging eave of each valve hall 3 and faces the firewall 2, to realize comprehensive three-dimensional fire extinguishing. In addition, the fire monitor 502 is located at the higher end and is not easy to explode. Although the spray pipe 402 is located at the lower end, it has anti-explosion performance that will be described in detail below. This greatly reduces a risk of a fatal damage to all fire extinguishing systems in the region of the converter transformer 1 due to high-energy explosive impact of a fire.

As shown in FIG. 1, a middle part of each converter transformer 1 is provided with the bushing 16 and a bushing lifting seat. The spray pipe 402 is disposed next to the bushing 16 and the bushing lifting seat, and the spray pipe 402 is an anti-explosion spray pipe 402. The spray pipe 402 is a cross-shaped pipe composed of the horizontal pipe and a vertical pipe, and the vertical pipe, the lifting seat, and the bushing 16 are separately perpendicular to the ground. The horizontal pipe is connected to the first fire pipe 401 on the lateral side of the firewall 2, and the horizontal pipe and the vertical pipe each are provided with a plurality of openings. A fire and an explosion may most easily occur on the bushing 16, the bushing lifting seat, and other weak parts of the converter transformer 1 first. Therefore, the spray pipe 402 is disposed next to the bushing 16 and the bushing lifting seat. The vertical pipe of the spray pipe 402, the lifting seat, and the bushing 16 are separately perpendicular to the ground. The spray pipe 402 can spray the fire extinguishing medium, and protection against fires of the weak parts is strengthened by using the vertical pipe of the spray pipe 402, thereby improving fire extinguishing efficiency. After the fire or explosion occurs on the converter transformer 1, an apparatus closest to the converter transformer 1 is damaged first, in other words, the spray pipe at the lower end is easily damaged. Each spray pipe in an existing fire extinguishing system is equipped with a pressure sprayer, that is, the pressure sprayer converts a medium into foam and sprays the foam for fire extinguishing. Once the spray pipe is blown down, the corresponding sprayer is also destroyed. In this case, the medium generated by the medium generation system continues to flow out through the spray pipe, but cannot be used for fire extinguishing because it cannot be converted to foam. As a result, the medium is wasted. The medium generation subsystems in this embodiment are disposed at the far end. Moreover, the fire extinguishing media output by the first extinguishing medium generation subsystem 6 and the second fire extinguishing medium generation subsystem 7 are CAF, and there is no need to deploy the pressure sprayer to convert the media into foam. Therefore, even if the spray pipe is blown down, the fire extinguishing systems still work normally. The CAF generated by the first fire extinguishing medium generation subsystem 6 and the second fire extinguishing medium generation subsystem 7 continues to be sprayed onto the fire site through the outlet of the pipe to perform fire extinguishing continuously.

A noise reduction plate (not shown in the figure) is disposed around the converter transformer 1. The noise reduction plate and the converter transformer 1 are located between two firewalls 2 as a whole. The bushing 16 and the bushing lifting seat pass through the noise reduction plate, and are located right above the middle part of the converter transformer 1. The first fire pipe 401 on the firewall 2 passes through the noise reduction plate to be connected to the horizontal pipe, the plurality of outlets of the horizontal pipe face the converter transformer 1, and the vertical pipe passes through the noise reduction plate and is parallel to the bushing 16 and the bushing lifting seat. The noise reduction plate can effectively eliminate noise of the converter transformer 1.

Figure 5:
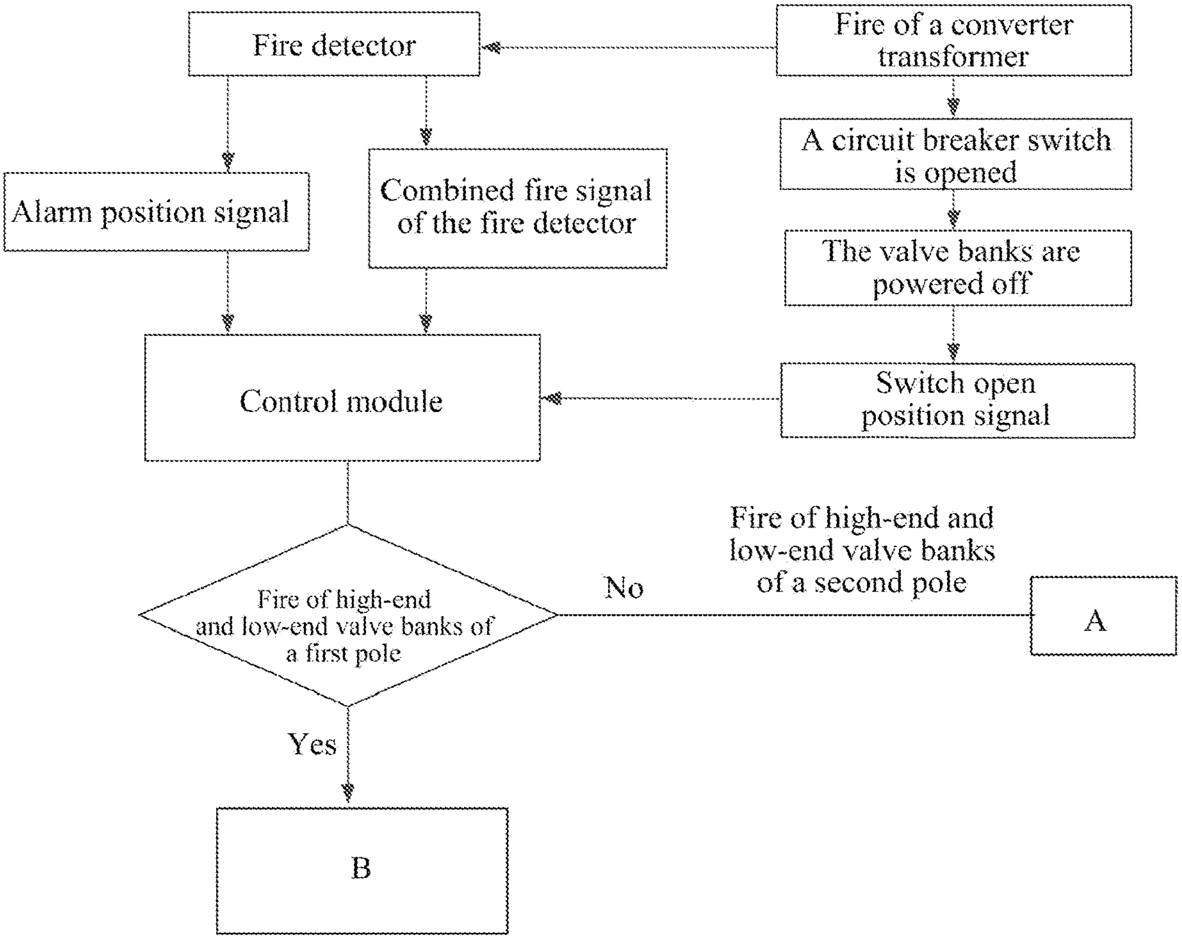
FIG. 5 is a schematic diagram of a fire extinguishing process of a fire extinguishing system for a UHV converter station according to an embodiment of the present disclosure.
Figure 6:
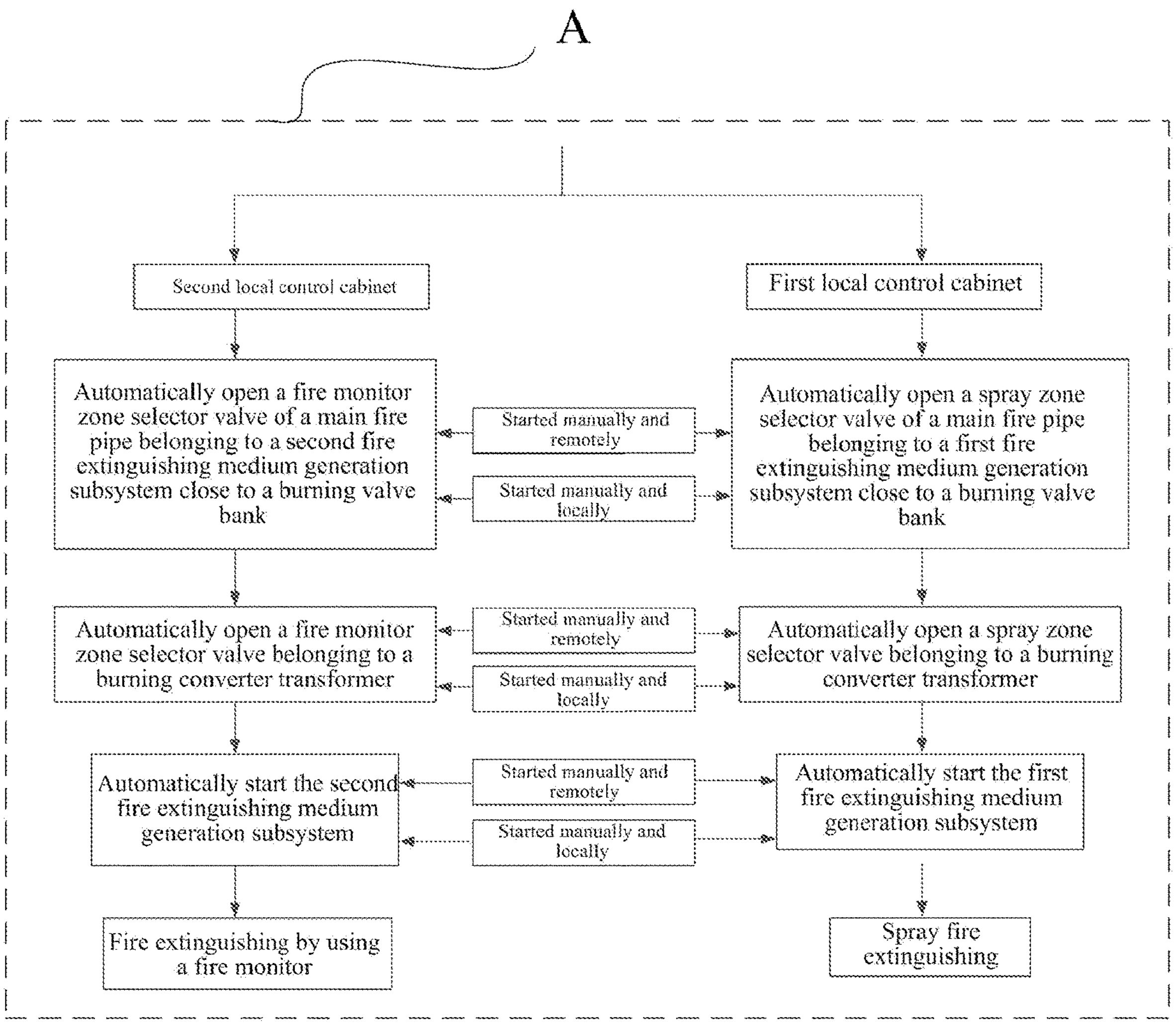
FIG. 6 is a detailed flowchart of part A of a fire extinguishing process of a fire extinguishing system for a UHV converter station according to an embodiment of the present disclosure.
Figure 7:
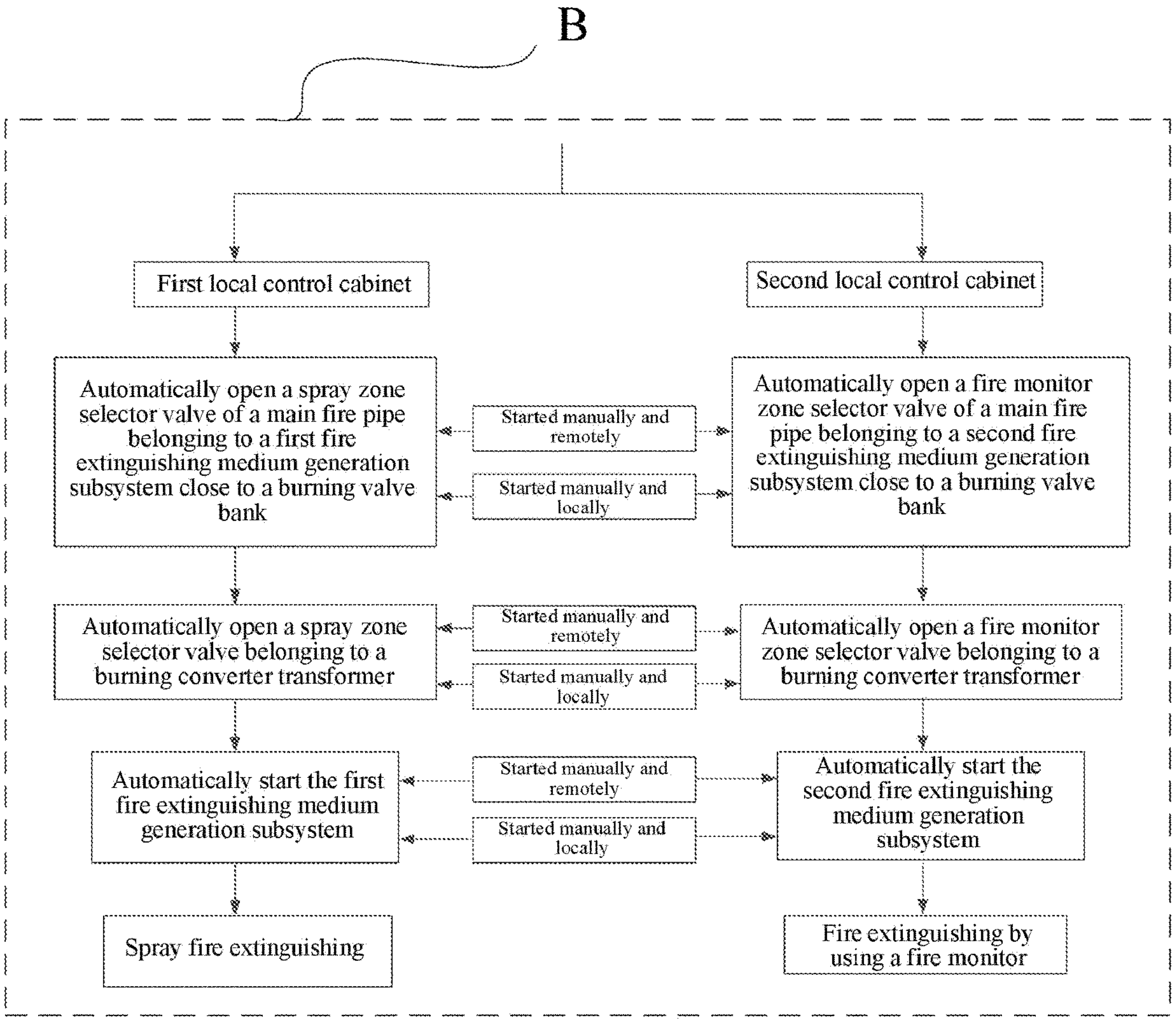
FIG. 7 is a detailed flowchart of part B of a fire extinguishing process of a fire extinguishing system for a UHV converter station according to an embodiment of the present disclosure.
Figure 10:
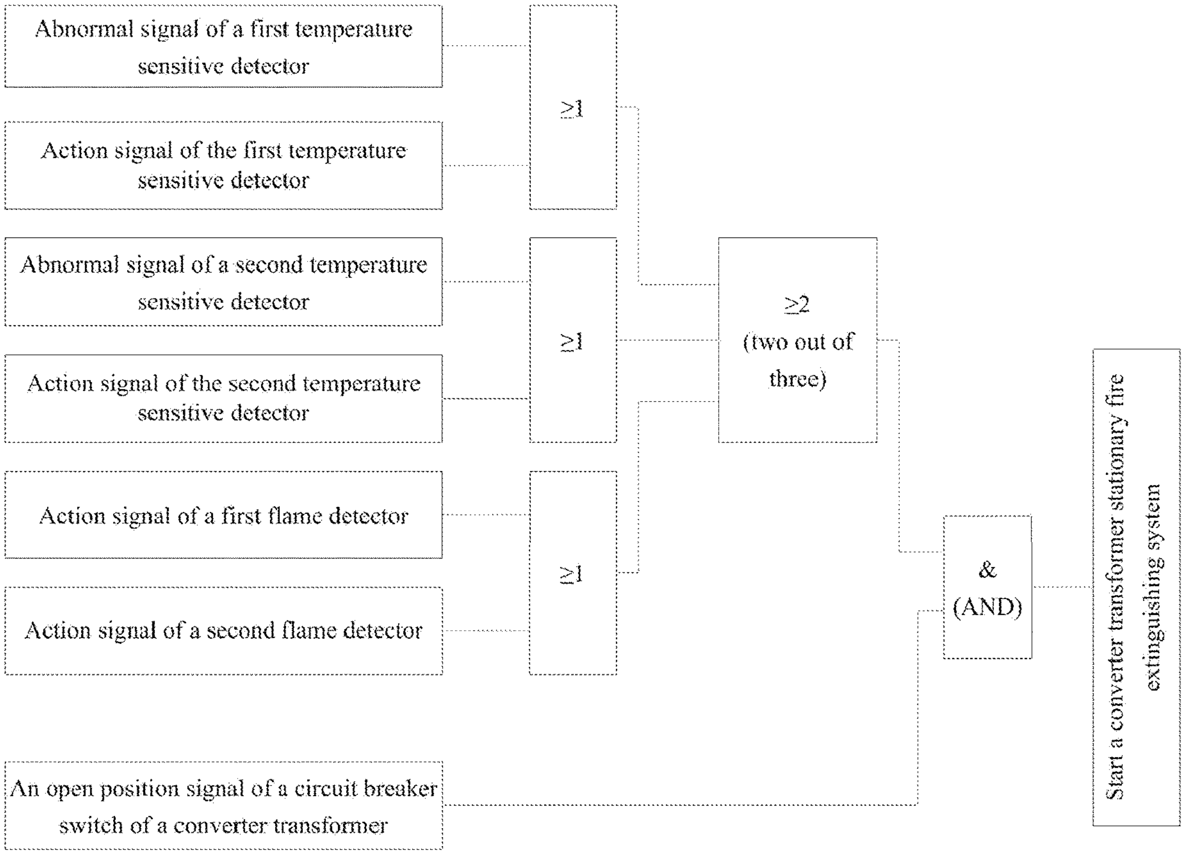
FIG. 10 is a schematic diagram of "two out of three" of fire detection according to an embodiment of the present disclosure.

A working process of Embodiment 1 all described above of the present disclosure is as follows: As shown in FIG. 5 to FIG. 7, only a fire detector is used to detect a fire. In practice, the fire needs to be detected by using a temperature sensitive detector, a flame detector, and the like. A body of the single-valve bank converter transformer 100 is independently provided with two cable temperature sensitive detectors in parallel (not shown in the figure), namely, a first temperature sensitive detector and a second temperature sensitive detector. Two flame detectors are disposed on the firewall 2 around the converter transformer 1, namely, a first flame detector and a second flame detector. When the first flame detector sends an action signal and the first temperature sensitive detector sends an action signal, and a "two out of three" condition is met (FIG. 10), a combined alarm system sends an audible and visual alarm signal. When only the flame detector or the cable-type temperature sensitive detector sends an action signal, the combined alarm system does not report an alarm. In addition, when the converter transformer 1 of a phase is abnormal, a circuit breaker switch of the single-valve bank converter transformer 100 sends a response action, the circuit breaker switch is opened, and the valve bank is powered off. The audible and visual alarm signal, an alarm position signal, and a circuit breaker switch open position signal are transmitted to the control module 8, and the control module 8 starts the fire extinguishing system.

The following describes a detailed fire extinguishing process by using a fire of the higher-end and lower-end valve banks of the first pole as an example. Certainly, a processing method for a fire of another pole is similar.

When the higher-end and lower-end valve banks of the first pole are on fire, because the higher-end and lower-end valve banks of the first pole are disposed in the square of the first pole, the first fire extinguishing medium generation subsystem 6 is also disposed in the square of the first pole, and the first zone selector valve 11 and the second zone selector valve 12 each are connected to the first fire extinguishing medium generation subsystem 6 by using the pipes, startup of the first zone selector valve 11 and the second zone selector valve 12 is controlled to select the CAF spray fire extinguishing system 4 or the CAF fire monitor-based fire extinguishing system 5 to extinguish the fire. Because spray fire extinguishing has a quicker response and wider coverage than fire extinguishing by using the fire monitor, spray fire extinguishing is preferentially performed for the purpose of extinguishing the fire as soon as possible. In addition, a fire extinguishing medium generation system with a short pipe path is selected to save more time. Therefore, the control module opens, by using the first local control cabinet 9, the first zone selector valve 11 connected to the first fire extinguishing medium generation subsystem 6 closest to the valve banks on fire, and automatically starts the first fire extinguishing medium generation subsystem 6. The first fire-fighting medium generation subsystem 6 provides foam for the first fire pipe 401, and the first fire pipe 401 connected to the first zone selector valve 11 emits foam by using the spray pipe 402, to realize spray fire extinguishing for the higher-end and lower-end valve banks of the first pole. The higher-end and lower-end valve banks of the first pole are the higher-end valve bank of the first pole and the lower-end valve bank of the first pole.

The second fire extinguishing medium generation subsystem 7 is located in the square of the second pole, and is far away from the higher-end and lower-end valve banks of the first pole, and the fire monitor 502 makes a response more slowly than the spray pipe 402. Therefore, the second fire extinguishing medium generation subsystem 7 can be used to provide foam for the fire monitor 502 for fire extinguishing by using the fire monitor 502. The control module 8 opens, by using the second local control cabinet 10, the second zone selector valve 12 connected to the second fire extinguishing medium generation subsystem 7, and automatically starts the second fire extinguishing medium generation subsystem 7, and the second fire pipe 501 connected to the second zone selector valve 12 emits foam by using the fire monitor 502, to realize fire extinguishing for the higher-end and lower-end valve banks of the first pole by using the fire monitor 502.

Likewise, when the higher-end and lower-end valve banks of the first pole are not on fire, but the higher-end and lower-end valve banks of the second pole are on fire, because the higher-end and lower-end valve banks of the second pole are disposed in the square of the second pole, the second fire extinguishing medium generation subsystem 7 is also disposed in the square of the second pole, and the second fire extinguishing medium generation subsystem 7 is close to the higher-end and lower-end valve banks of the second pole, the second fire extinguishing medium generation subsystem 7 is used to provide foam for the first fire pipe 401, to reduce fire extinguishing time by using a shortest pipe path and a fastest response mode. In this case, the control module opens, by using the first local control cabinet 9, the first zone selector valve 11 connected to the second fire extinguishing medium generation subsystem 7 closest to the higher-end and lower-end valve banks of the second pole on fire, and automatically starts the second fire extinguishing medium generation subsystem 7, and the first fire pipe 401 connected to the first zone selector valve 11 emits foam by using the spray pipe 402, to realize spray fire extinguishing for the higher-end and lower-end valve banks of the second pole. The higher-end and lower-end valve banks of the second pole are the higher-end valve bank of the second pole and the lower-end valve bank of the second pole.

When the higher-end and lower-end valve banks of the second pole are on fire, the control module opens, by using the second local control cabinet 10, the second zone selector valve 12 connected to the second fire extinguishing medium generation subsystem 7, and automatically starts the second fire extinguishing medium generation subsystem 7, and the second fire pipe 501 connected to the second zone selector valve 12 emits foam by using the fire monitor 502, to realize fire extinguishing for the higher-end and lower-end valve banks of the second pole by using the fire monitor 502.

It should be noted that, in an initial state, a valve between the first fire extinguishing medium generation subsystem 6 and the first fire pipe 401 of the first pole close to the first fire extinguishing medium generation subsystem 6 is normally closed, and a valve between the second fire extinguishing medium generation subsystem 7 and the second fire pipe 501 of the first pole far away from the second fire extinguishing medium generation subsystem 7 is normally closed; a valve between the second fire extinguishing medium generation subsystem 7 and the first fire pipe 401 of the second pole close to the second fire extinguishing medium generation subsystem 7 is normally closed, and a valve between the first fire extinguishing medium generation subsystem 6 and the second fire pipe 501 of the second pole far away from the first fire extinguishing medium generation subsystem 6 is normally closed; and the zone selector valves and the fire extinguishing medium generation subsystems can be started manually started locally or remotely.

To sum up, in the fire extinguishing process, the two fire extinguishing systems are started at the same time. The two fire extinguishing medium generation subsystems are disposed near two UHV converter station squares respectively, which are far apart. When a converter transformer 1 is on fire, response time of the two subsystems is different. To achieve an optimal fire extinguishing effect, when a converter transformer 1 in the single-valve bank converter transformer 100 is on fire, CAF generated by one CAF generation subsystem closest to the converter transformer 1 on fire is preferentially provided for the first fire pipe 401 around the converter transformer 1 by opening or closing the zone selector valve in a control vale room, such that the horizontal pipe of the spray pipe 402 releases the CAF to cover the entire region of the converter transformer 1, and the vertical pipe of the spray pipe 402 enhances coverage of a region of the bushing 16. In addition, the other CAF generation subsystem far away from the converter transformer 1 on fire provides CAF for the fire monitor 502 on the overhanging eave of the valve hall 3 by using a zone selector valve room, to realize fire suppression and extinguishing for key fire regions of the converter transformer 1.

As shown in FIG. 3, there are a total of 24 converter transformers 1 in four single-valve bank converter transformers 100 in the whole station, and there is a large position span for the converter transformers 1, resulting in different system response time. To achieve maximum fire extinguishing efficiency, system response sequences of converter transformers 1 on fire in different positions are different. As shown in FIG. 3, when the higher-end valve bank 200 of the first pole is on fire, the first fire extinguishing medium generation subsystem 6 close to the higher-end valve bank 200 of the first pole preferentially provides foam for the spray pipe 402, and the second fire extinguishing medium generation subsystem 7 far away from the valve bank provides foam for the fire monitor 502. When the higher-end valve bank 500 of the second pole is on fire, the second fire extinguishing medium generation subsystem 7 close to the higher-end valve bank 500 of the second pole preferentially provides foam for the spray pipe 402, and the first fire extinguishing medium generation subsystem 6 far away from the higher-end valve bank 500 of the second pole provides foam for the fire monitor 502.

A fire extinguishing principle is set, such that the spray pipe 402 located at the lower end is used to perform whole-region spray fire extinguishing for the converter transformer 1, the fire monitor 502 located at the higher end is used to realize fire suppression and extinguishing for the key parts, and the control module 8 can perform control to preferentially perform fire extinguishing around the converter transformer 1 located at the lower end, so as to realize point and plane-combined fire extinguishing. This can improve fire extinguishing efficiency and achieve high fire extinguishing reliability.

To further improve the fire extinguishing effect, for example, when there is a fire spot at the higher end of the converter transformer 1, but the spray pipe 402 at the lower end cannot spray foam onto the high fire spot, after a preset time interval, the control module 8 controls the fire extinguishing medium, output by the normal fire extinguishing medium generation subsystem, to be further transmitted to the second fire pipe 501. The outlet of the second fire 501 pipe is located at the higher end above the converter transformer 1, and the fire extinguishing medium is emitted from the outlet of the second fire pipe 501 for fire suppression and extinguishing. The control module 8 can also control the normal fire extinguishing medium generation subsystem to simultaneously output the foam to the first fire pipe 401 and the second fire pipe 501. However, the second fire pipe 501 is connected to the fire monitor 502 and its response time is generally 5 min, and the first fire pipe 401 is connected to the spray pipe 402 and its response time is generally 90 s. Therefore, there is a delay for the two terminal release apparatuses. If the foam is provided for the first fire pipe 401 and the second fire pipe 501 at the same time, there is no sufficient foam for the first fire pipe 401 for spraying, prolonging response time of fire extinguishing. In addition, even if foam is provided for the first fire pipe 401 and the second fire pipe 501 at the same time, due to limited response time of the fire monitor 502, there will be foam but foam emitting time is not reached. In this period of time, it is a waste of resources and time to provide foam for the fire monitor 502. Therefore, sufficient foam is preferentially provided for the spray pipe 402 at the lower end, and this can reduce fire suppression time and cover a fire coverage to a maximum extent. After the spray pipe 402 sprays for several minutes, whole-region fire extinguishing has been performed for the fire region for several minutes. At this time, the response time of the fire monitor 502 is reached, and the fire monitor 502 is provided with foam to further suppress the fire, so as to achieve the optimal fire extinguishing effect.

Figure 8:
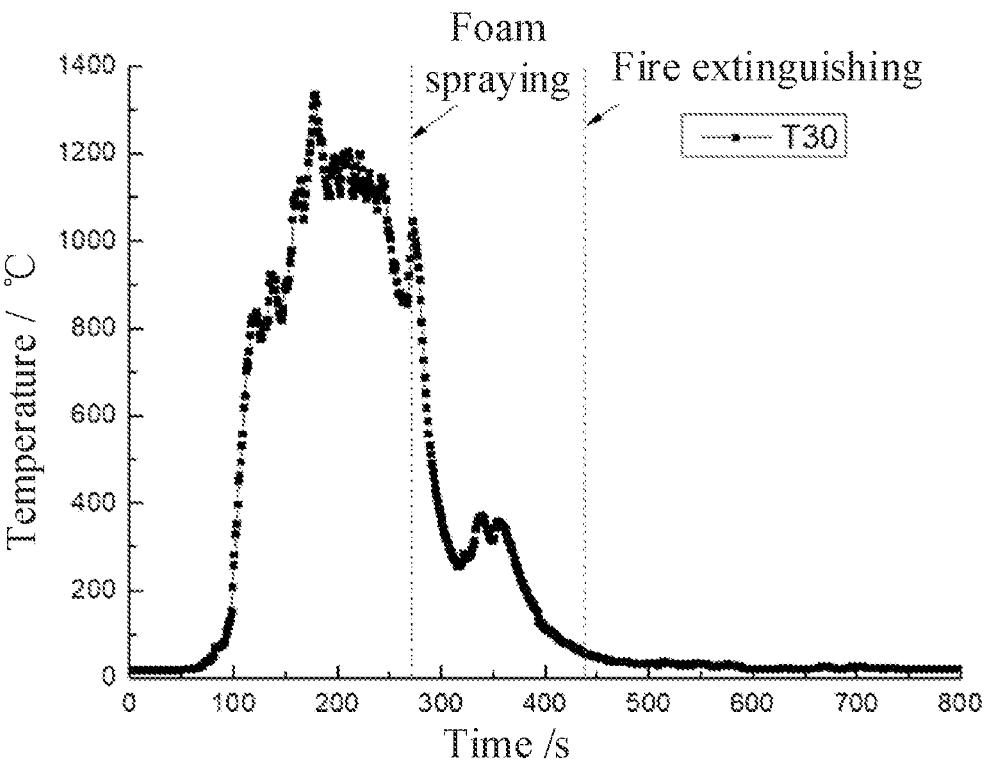
FIG. 8 is a schematic diagram of an experimental result of a spray fire extinguishing system in a fire extinguishing system for a UHV converter station according to an embodiment of the present disclosure.
Figure 9:
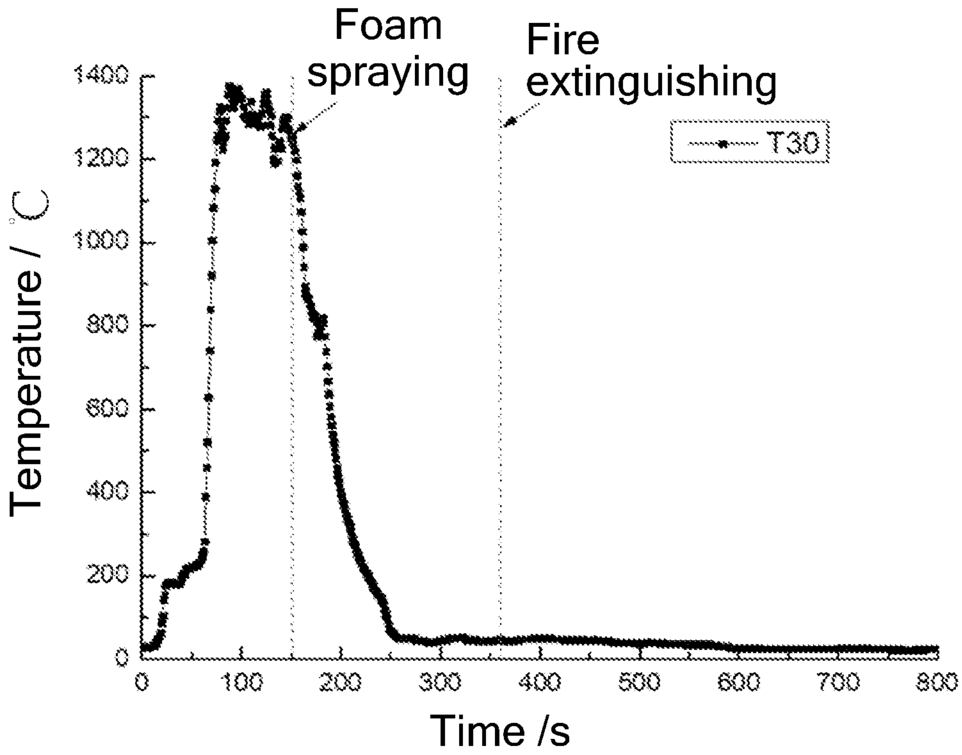
FIG. 9 is a schematic diagram of an experimental result of a fire monitor-based fire extinguishing system in a fire extinguishing system for a UHV converter station according to an embodiment of the present disclosure.

To verify that the fire extinguishing system and the fire extinguishing method in the present disclosure are for a fire of the UHV converter transformer, a fire test is carried out for a physical full-scale 1:1 UHV converter transformer. Area of a three-dimensional overflow fire surface is more than 100m$^2$. First, oil temperature of the transformer is heated to about 150° C., and the oil is ignited. After full combustion, the CAF fire extinguishing system is started. The spray fire extinguishing system 4 and the fire monitor-based fire extinguishing system 5 are tested independently. A test result of the spray fire extinguishing system 4 is shown in FIG. 8, and key parameters of the spray fire extinguishing system 4 are shown in Table 1. A test result of the fire monitor-based fire extinguishing system 5 is shown in FIG. 9, and key parameters of the fire monitor-based fire extinguishing system 5 are shown in Table 2. It can be learned from FIG. 8 that fire extinguishing time of the spray fire extinguishing system 4 is 180 s, and it can be learned from FIG. 9 that fire extinguishing time of the fire monitor-based fire extinguishing system 5 is 210 s. A response speed of the spray fire extinguishing system 4 is greater than that of the fire monitor-based fire extinguishing system 5. Two independent tests prove that the fire extinguishing system and the fire extinguishing method proposed in the present disclosure completely meet a fire extinguishing requirement of the fire of the UHV converter station.

TABLE 1

| Key parameters of the spray fire extinguishing system<br>Key parameters of a fire extinguishing process | |
|---|---|
| Basic oil temperature/° C. | 155 |
| Preset combustion time/min | 4.3 |
| Flow of mixed liquid L/min | 2200 |
| Spray strength L/(min · m$^2$) | 12.5 |
| Fire control time/s | 30 |
| Fire extinguishing time/s | 180 |

TABLE 2

| Key parameters of the fire monitor-based fire extinguishing system<br>Key parameters of a fire extinguishing process | |
|---|---|
| Basic oil temperature/° C. | 155 |
| Preset combustion time/min | 3 |
| Flow of mixed liquid L/min | 2931 |
| Flow of a single fire monitor L/s | 24.4 |
| Fire control time/s | 93 |
| Fire extinguishing time/s | 210 |

According to the above technical solutions, in the fire extinguishing system for a UHV converter station in Embodiment 1, the fire pipe of one fire extinguishing system is disposed around each converter transformer 1 to perform fire extinguishing around each converter transformer 1. The fire pipe of the other fire extinguishing system is disposed above each converter transformer 1 to emit the fire extinguishing medium from above each converter transformer 1 for fire suppression and extinguishing. The two fire extinguishing systems realize whole-region complete coverage of the converter transformer 1, and completely cover all fire characteristics and behaviors around and above the UHV converter transformer 1. In addition, the two fire extinguishing medium generation subsystems are mutually standby. When one fire extinguishing medium generation subsystem is damaged, the other fire extinguishing medium generation subsystem can continue to provide the fire extinguishing medium, thereby achieving high system reliability. In addition, the medium generation subsystems in this embodiment are disposed at the far end. The fire extinguishing media output by the first extinguishing medium generation subsystem 6 and the second fire extinguishing medium generation subsystem 7 are CAF, and there is no need to deploy the pressure sprayer to convert the media into foam. Therefore, even if the spray pipe is blown down, the fire extinguishing systems still work normally. The CAF generated by the first fire extinguishing medium generation subsystem 6 and the second fire extinguishing medium generation subsystem 7 continues to be sprayed onto the fire site through the outlet of the pipe to perform fire extinguishing continuously.

The above embodiments are only used to explain the technical solutions of the present disclosure, and are not intended to limit the same. Although the present disclosure is described in detail with reference to the above embodiments, those of ordinary skill in the art should understand that they can still modify the technical solutions described in the above embodiments, or make equivalent substitutions on some technical features therein. These modifications or substitutions do not make the essence of the corresponding technical solutions deviate from the spirit and scope of the technical solutions in the embodiments of the present disclosure.

The invention claimed is:

1. A fire extinguishing method for a fire extinguishing system for a converter station, wherein the converter station comprises a plurality of converter transformers disposed at equal intervals and a plurality of firewalls, immediately adjacent converter transformers of the plurality of converter transformers are separated by one of the plurality of firewalls, wherein the fire extinguishing system comprises at least one spray fire extinguishing system and at least one fire monitor based fire extinguishing system, each of the at least one spray fire extinguishing system comprises a plurality of first fire pipes and a plurality of spray pipes; each of the at least one fire monitor based fire extinguishing system comprises a plurality of second fire pipes and a plurality of fire monitors;

at least one of the plurality of fire monitors is disposed above each of the plurality of firewalls, and each of the plurality of fire monitors is connected to a corresponding one of the plurality of second fire pipes; at least one of the plurality of spray pipes is disposed on each of the plurality of firewalls, and each of the plurality of spray pipes is connected to a corresponding one of the plurality of first fire pipes; and the plurality of fire monitors are arranged above the plurality of converter transformers to emit a fire extinguishing medium onto the plurality of converter transformers, outlets of the plurality of spray pipes are facing the plurality of converter transformers to emit the fire extinguishing medium onto lateral sides of the plurality of converter transformers; and wherein the method comprises:

detecting whether the plurality of converter transformers are on fire;

in response to detecting that one of the plurality of converter transformers is on fire, starting the at least one spray fire extinguishing system and the at least one fire monitor based fire extinguishing system to extinguish the fire, emitting the fire extinguishing medium from the outlets of one of the plurality of spray pipes that is facing the one of the plurality of converter transformers that is on fire onto the lateral sides of the one of the plurality of converter transformers that is on fire, and emitting the fire extinguishing medium from one of the plurality of fire monitors that is facing the one of the plurality of converter transformers that is on fire onto the one of the plurality of converter transformers that is on fire.

2. The fire extinguishing method for the fire extinguishing system for the converter station according to claim 1, wherein the fire extinguishing system further comprises a first fire extinguishing medium generation subsystem, a second fire extinguishing medium generation subsystem, and a control module;

wherein the method further comprises:

in response to detecting that the one of the plurality of converter transformers is on fire, controlling, by the control module, one of the first and second fire extinguishing medium generation subsystems that is closer to the one of the plurality of converter transformers that is on fire to preferentially provide the fire extinguishing medium for the one of the plurality of first fire pipes that is facing the one of the plurality of converter transformers that is on fire, and controlling the other one of the first and second fire extinguishing medium generation subsystems that is farther from the one of the plurality of converter transformers that is on fire to provide the fire extinguishing medium for one of the plurality of second fire pipes.

3. The fire extinguishing method for the fire extinguishing system for the converter station according to claim 2, wherein the fire extinguishing system further comprises higher-end and lower-end valve banks of a first pole, a first local control cabinet, higher-end and lower-end valve banks of a second pole, a second local control cabinet, pluralities of first zone selector valves, and pluralities of second zone selector valves, the plurality of first fire pipes of each of the at least one spray fire extinguishing system are connected to a corresponding one of the pluralities of first zone selector valves, respectively, the plurality of second fire pipes of each of the at least one fire monitor based fire extinguishing system are connected to a corresponding one of the pluralities of second zone selector valves, respectively, the pluralities of first zone selector valves and the pluralities of second zone selector valves are connected to the first fire extinguishing medium generation subsystem and the second fire extinguishing medium generation subsystem through pipes, the higher-end and lower-end valve banks of the first pole are disposed in a square of the first pole, and the higher-end and lower-end valve banks of the second pole are disposed in a square of the second pole; and wherein the method further comprises:

detecting whether the higher-end and lower-end valve banks of the first pole are on fire;

in response to detecting that the higher-end and lower-end valve banks of the first pole are on fire, opening by the control module, through the first local control cabinet, one of the pluralities of first zone selector valves within the first pole which is connected to the first fire extinguishing medium generation subsystem closest to the higher-end and lower-end valve banks of the first pole, starting the first fire extinguishing medium generation subsystem automatically, and emitting the fire extinguishing medium from the plurality of spray pipes within the first pole which are connected to the plurality of first fire pipes within the first pole connected to the one of the pluralities of first zone selector valves within the first pole, respectively.

4. The fire extinguishing method for the fire extinguishing system for the converter station according to claim 3, wherein the method further comprises:

in response to detecting that the higher-end and lower-end valve banks of the first pole are on fire, opening by the control module, through the second local control cabinet, one of the pluralities of second zone selector valves within the first pole which is connected to the second fire extinguishing medium generation subsystem, starting the second fire extinguishing medium generation subsystem automatically, and emitting the fire extinguishing medium from the plurality of fire monitors within the first pole which are connected to the plurality of second fire pipes within the first pole connected to the one of the pluralities of second zone selector valves within the first pole, respectively.

5. The fire extinguishing method for the fire extinguishing system for the converter station according to claim 3, wherein the method comprises:

in response to detecting that the higher-end and lower-end valve banks of the first pole are not on fire, but the higher-end and lower-end valve banks of the second pole are on fire, opening by the control module, through the second local control cabinet, one of the pluralities of first zone selector valves within the second pole which is connected to the second fire extinguishing medium generation subsystem closest to the higher-end and lower-end valve banks of the second pole, starting the second fire extinguishing medium generation subsystem automatically, and emitting the fire extinguishing medium from the plurality of spray pipes within the second pole which are connected to the plurality of first fire pipes within the second pole connected to the one of the pluralities of first zone selector valves within the second pole, respectively.

6. The fire extinguishing method for the fire extinguishing system for the converter station according to claim 5, wherein the method further comprises:

in response to detecting that the higher-end and lower-end valve banks of the second pole are on fire, opening by the control module, through the second local control cabinet, the one of the pluralities of second zone selector valves within the second pole which is connected to the second fire extinguishing medium generation subsystem, starting the second fire extinguishing medium generation subsystem automatically, and emitting the fire extinguishing medium from the plurality of fire monitors within the second pole which are connected to the plurality of second fire pipes within the second pole connected to the one of the pluralities of second zone selector valves within the second pole, respectively.

7. The fire extinguishing method for the fire extinguishing system for the converter station according to claim 3, wherein the method further comprises:

in response to detecting that the higher-end and lower-end valve banks of the first pole are on fire, and one of the first fire extinguishing medium generation subsystem and the second fire extinguishing medium generation subsystem is faulty, controlling, by the control module, the fire extinguishing medium to be output from the other one of the first fire extinguishing medium generation subsystem and the second fire extinguishing medium generation subsystem which is not faulty and to be transmitted to the plurality of first fire pipes within the first pole which are connected to the plurality of spray pipes within the first pole to preferentially extinguish the fire by the plurality of spray pipes within the first pole.

8. The fire extinguishing method for the fire extinguishing system for the converter station according to claim 7, wherein the method further comprises:

in response to detecting that the higher-end and lower-end valve banks of the first pole are on fire, and the first fire extinguishing medium generation subsystem is faulty, opening by the control module, through the second local control cabinet, the one of the pluralities of first zone selector valves within the first pole which is connected to the second fire extinguishing medium generation subsystem, starting the second fire extinguishing medium generation subsystem automatically, transmitting, by the second fire extinguishing medium generation subsystem, the fire extinguishing medium to the plurality of first fire pipes within the first pole, and emitting the fire extinguishing medium from the plurality of spray pipes within the first pole which are connected to the plurality of first fire pipes within the first pole connected to the one of the pluralities of first zone selector valves within the first pole, respectively.

9. The fire extinguishing method for the fire extinguishing system for the converter station according to claim 7, wherein the method comprises:

in response to detecting that the higher-end and lower-end valve banks of the first pole are on fire, and the second fire extinguishing medium generation subsystem is faulty, opening by the control module, through the first local control cabinet, the one of the pluralities of first zone selector valves within the first pole connected to the first fire extinguishing medium generation subsystem, starting the first fire extinguishing medium generation subsystem automatically, transmitting, by the first fire extinguishing medium generation subsystem, the fire extinguishing medium to the plurality of first fire pipes within the first pole, and emitting the fire extinguishing medium from the plurality of spray pipes within the first pole which are connected to the plurality of first fire pipes within the first pole connected to the one of the pluralities of first zone selector valves within the first pole, respectively.

10. The fire extinguishing method for the fire extinguishing system for the converter station according to claim 7, in response to detecting that the higher-end and lower-end valve banks of the first pole are on fire, and one of the first fire extinguishing medium generation subsystem and the second fire extinguishing medium generation subsystem is faulty, the method further comprises:

after a preset time interval, controlling, by the control module, the fire extinguishing medium to be output from the other one of the first fire extinguishing medium generation subsystem and the second fire extinguishing medium generation subsystem which is not faulty and to be further transmitted to the plurality of second fire pipes within the first pole, wherein the fire extinguishing medium is emitted from the plurality of fire monitors within the first pole which are connected to the plurality of second fire pipes within the first pole, respectively, and a value range of the preset time interval is 0 min to 5 min.

11. The fire extinguishing method for the fire extinguishing system for the converter station according to claim 10, wherein the method comprises:

when the preset time interval is 0 min, controlling, by the control module, the fire extinguishing medium to be output from the other one of the first fire extinguishing medium generation subsystem and the second fire extinguishing medium generation subsystem which is not faulty and to be transmitted to the plurality of first fire pipes within the first pole and the plurality of second fire pipes within the first pole at the same time.

* * * * *